April 29, 1941.  J. GOLDSTEIN  2,239,709
SEPARATOR DEVICE
Filed March 31, 1939  2 Sheets-Sheet 1

JULIUS GOLDSTEIN.
INVENTOR.

BY Ely & Pattison
ATTORNEYS.

April 29, 1941.    J. GOLDSTEIN    2,239,709
SEPARATOR DEVICE
Filed March 31, 1939    2 Sheets-Sheet 2
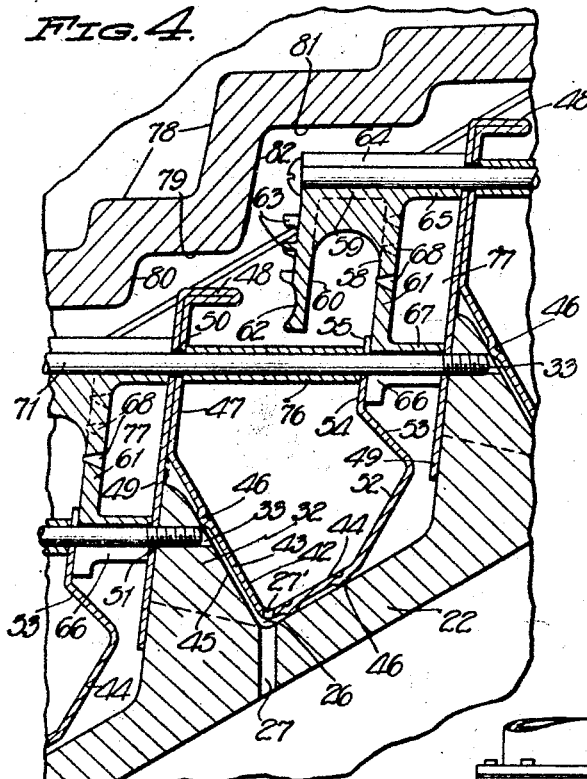
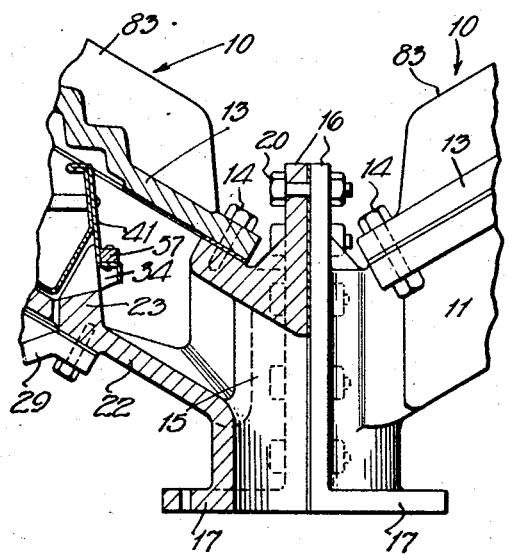
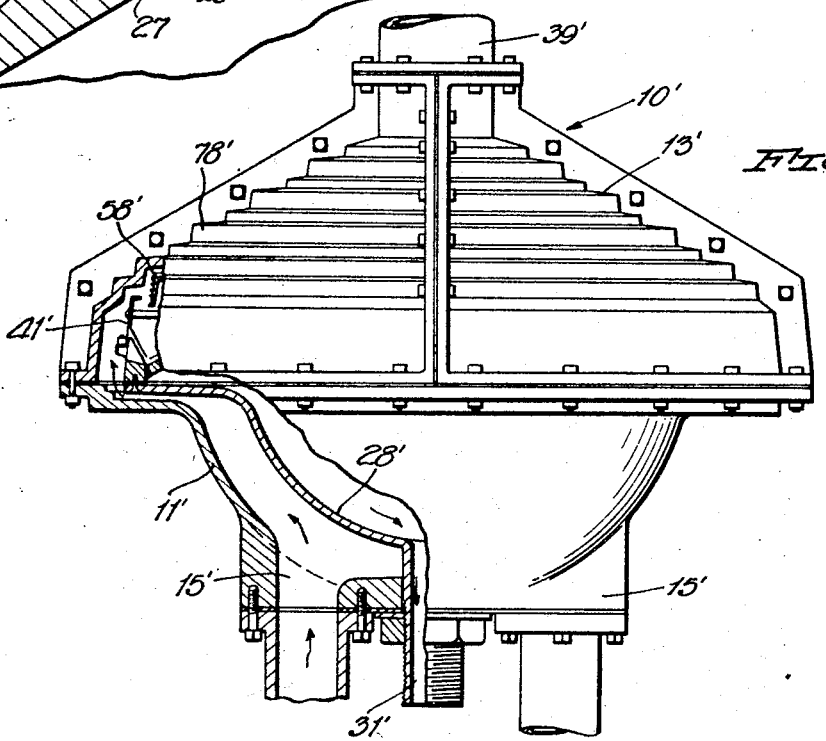
JULIUS GOLDSTEIN.
INVENTOR.
BY Ely & Pattison,
ATTORNEYS.

Patented Apr. 29, 1941

2,239,709

UNITED STATES PATENT OFFICE 2,239,709

SEPARATOR DEVICE

Julius Goldstein, Brooklyn, N. Y.

Application March 31, 1939, Serial No. 265,077

9 Claims. (Cl. 183—75)

This invention relates to improvements in separator devices and more particularly to a separator device for separating water from steam; for distilling purposes; and for separating harmfull substances from the exhaust gases of internal combustion engines.

The primary object of the invention is to provide an efficient separator device by which heavier fluids may be separated from lighter vapors, such as water from steam, in the passage of steam from its source to its destination of use.

Another feature of the invention resides in providing an inclined zig-zag passage for the steam vapors which must successively pass a plurality of upwardly stepped traps which are provided with baffle walls to cause the heavy water particles to be separated from the steam vapors, there being means associated with the traps to gravitationally receive the water and pass it to a common water discharge.

Other features of the invention will be apparent as the following specification is read in conjunction with the accompanying drawings, in which:

Figure 1 is a top plan view of my separator device.

Figure 2 is an enlarged vertical transverse sectional view on the line 2—2 of Figure 1.

Figure 3 is a fragmentary front elevational view with part broken away of one of the baffle castings.

Figure 4 is a greatly enlarged fragmentary vertical transverse sectional view.

Figure 5 is a fragmentary sectional elevational view illustrating the manner in which two separator devices may be connected with a single steam inlet.

Figure 6 is a side elevational view partly in section of a modified form of the invention.

Throughout the following description I shall refer to the separator device for use in separating water particles from steam, and I wish it to be understood that other heavier particles may be divided from vapors or gases, and I do not wish to be limited to the uses to which the invention may be applied.

Referring to the drawings by reference characters, the numeral 10 designates my separator device in its entirety, which includes an inclined rectangular shaped casing 11 consisting of a body 12 of cast metal having its open top closed by a cover 13 which is secured to the body by bolts 14. The lower end of the body 12 is centrally provided with a steam inlet 15 and the inlet portion of the body is provided with a vertical flange 16 and a horizontal flange 17. A fitting 18 having a vertical flange 19 fits against the flange 16 and is secured by bolts 20. The fitting 18 also has a horizontal flange 21 which alines with the flange 17 to form an annular attaching flange to which the end of a steam supply pipe (not shown) may be bolted.

The body 12 is provided with an inclined bottom wall 22 having a series of equidistantly spaced substantially V-shaped steps 23 extending lengthwise from one end to the other. Each step 23 is provided with an inclined top face 24 extending forwardly from the bottom wall 22, and with a rearwardly inclined front face 25. The juncture of the top face 24 with the bottom wall 22 forms a trough 26. Drain openings 27 are provided in the bottom wall 22 and have their inner ends opening into the troughs 26. The outer ends of the drain openings 27 open into a chamber 28 formed in a fitting 29 which is secured to the underside of the bottom wall 22 by bolts 30. The fitting 29 is provided with a flanged outlet 31 which may be connected with a water return pipe to the steam boiler which supplies the steam to the steam inlet 15.

Rising upwardly from the steps 23 are spaced relatively short upwardly tapered lugs 32, each of which is provided with a horizontal threaded opening 33, with the exception of the lowermost lugs. The end lugs of the lowermost row are provided with stepped down shoulders 34. Disposed above the uppermost step 23 is a relatively low upstanding wall 35 having spaced lugs 36 rising upwardly therefrom. The wall 35 cooperates with the upper end wall 37 of the body to provide a steam chamber 38. A pair of steam outlet nozzles 39—39 extend outwardly from the end wall 37 in communication with the chamber 38 and which nozzles have their free ends facing in opposite directions and provided with attaching flanges 40 by which they may be coupled with attaching flanges 40 by which they may be coupled with pipes for carrying the steam to other devices intended to receive the steam after its passage through the device 10.

Disposed within the space between adjacent steps 23 and between the top step 23 and wall 35 are sheet metal trough shaped members 41, three of which are shown in Figure 2 of the drawings. Each trough shaped member includes a substantially V-shaped bottom 42 formed by the downwardly converging walls 43 and 44 which are parallel to the rear inclined face 45 of the lug 32 and the inner face of the inclined bottom wall 22 respectively. Drain openings 27' are provided in the crotch portion of the V-shaped bottom 42. Spaced teats 46 are struck outwardly from the walls 43 and 44 to position the same in spaced relation to the inclined face 45 and bottom wall 22 respectively. Extending upwardly from the top of the wall 43 and integral therewith is a wall 47, the top of which is provided with an inwardly extending horizontal lip 48. Integral with the lip 48 and fitting against the front side of the wall 47 is a wall 49 which depends well below the wall 47 and which flatly fits against the front face of the step 23 and lug 32. The walls 47 and 49 are parallel to the rearwardly inclined front wall 25 of the step and these walls are provided with alined openings 50 just below the lip 48. The wall 49 below the wall 47 is provided with openings 51 which aline with the threaded openings 33.

Integral with and extending upwardly and rearwardly from the wall 44 is a lower side wall section 52, and extending upwardly and forwardly from the side wall section 52 is an upper side wall section 53, from which an upstanding rearwardly inclined flange 54 extends. The flange 54 is provided with spaced notches 55 adapted to aline with the spaced openings 50.

The wall 49 of the lowermost trough member 41 is provided with a forwardly extending step portion 56 which seats upon the stepped shoulders 34 and is held throughout by a rod 57 which is secured by screws or other like fastening elements.

Each trough shaped member 41 is preferably constructed of a single blank of sheet metal bent into the shape herein shown and described.

Associated with each trough shaped member 41 may be a substantially inverted U-shaped member 58 which is of cast metal or suitably formed in sheet metal and of a length to extend the length of the body 12. The member 58 includes a flat horizontal top wall 59, and spaced depending front and rear walls 60 and 61 respectively. The front and rear walls 60 and 61 are upwardly and rearwardly inclined at the same angle as the walls 47—49 and flange 54 of the trough shaped member 41. The front wall terminates just below the plane of the adjacent lip 48 of the next lower trough shaped member 41 in a concave deflector lip 62. The front side of the wall 60 is provided with longitudinal rows of staggered arch shaped deflector lugs 63 as shown in Figure 3 of the drawings. The top wall 59 is provided with spaced notches 64 which aline with the openings 50 of the next adjacent higher trough shaped member 41, and spacer lugs 65 extend rearwardly from the top wall 59 and engage the wall 49 of the next higher trough shaped member. The lower edge of the side wall 61 is provided with spaced notches 66 which aline with the openings 51 in the next higher trough shaped member 41, and spacer lugs 67 extend rearwardly from the wall 61 and abut the depending wall 49 of the next higher trough shaped member 41. The rear wall 61 is provided with longitudinal rows of spaced staggered openings 68.

Having described the specific construction of each trough shaped member 41 and of each inverted U-shaped member 58, and their relative position with respect to each other, I shall now explain the manner in which the three pairs of coacting members 41 and 58 are secured in their successive stepped up arrangement.

The lowermost trough shaped member 41 has openings 69 in the front wall thereof which aline with the notches 55 of the flange 54 thereof, notches 66 of the lowermost member 58, and with the openings 33 of the lugs 32 of the second step. A bolt 70 passes through each alined opening 69, notch 55, notch 66, and threads into the alined threaded opening 33 of the lug of the second lowest step 23.

Bolts 71 pass through the notches 64 of the lowermost member 58 which aline with the openings 50 and notches 55 of the intermediate or second trough shaped member 41, alined notches 66 of the intermediate member 58 and thread into the threaded openings 33 in the lugs 32 of the uppermost step 23.

Bolts 72 pass through the intermediate member 58, uppermost members 41, and 58 in the same manner as the bolts 71, but the bolts 72 are threaded in threaded openings 73 in the lugs 36.

Bolts 74 extend through the notches 64 of the uppermost member 58 and engage threaded openings 75 adjacent the tops of the lugs 36.

Spacer sleeves 76 surround each of the bolts 70, 71, 72, and 74 intermediate the wall 47 and flange 54 of the respective trough shaped members 41 to maintain the front and rear walls thereof in fixed spaced relation. The rearwardly extending lugs 65 and 67 maintain the rear walls 61 in definite spaced relation with the adjacent walls 49 to provide vertical passages 77 which communicate with the troughs 26.

By reference to Figure 2 of the drawings, it will be seen that the lips 48 of the members 41 and top walls 59 of the members 58 impart a stepped up arrangement and to conform to this arrangement the cover 13 is provided with a series of steps 78 which extend the length thereof. Alternate steps 78 are of different width and the inner sides of the narrower steps are provided with horizontal surfaces 79 which are disposed in spaced relation above the lips 48 and vertical surfaces 80 which are disposed in spaced relation with the front wall 49 of the members 41. The wider steps 78 have flat horizontal inner surfaces 81 above and in spaced relation to the top walls 59 of the members 58, and vertical forwardly inclined surfaces 82 in spaced relation to the front walls 60. The surfaces 79, 80, 81, and 82 coact with the upper portions of the members 41 and 58 to provide a zig-zag steam passage from the lower inlet end of the casing 11 to the upper outlet end thereof.

Formed integral with the cover 13 and extending upwardly and transversely thereof, are spaced heat radiating fins 83.

In practice, steam entering the casing 11 through the steam inlet 15 will travel upwardly through the zig-zag passage to the chamber 38 and thence outwardly through the branch outlets 39—39. Any particles of water which may be present in the steam are baffled by the walls of the trough shaped member 41 and inverted U-shaped member 58 with the confronting step surfaces of the cover 13. Water particles which may be picked up by the baffling surfaces will drop downwardly by gravity, and that water which is trapped in the trough shaped members 41 drains through the openings 27' into the trough 26 and thence through the openings 27 into the chamber 28 from where the accumulated water is discharged through the outlet 31. Any water which may be trapped in the vertical passages 77 will drain directly into the troughs 26 and out through the openings 27, chamber 28, and outlet 31. The heat of the steam passing through the casing 11 in a zig-zag manner is radiated therefrom by the walls thereof and particularly by the stepped cover 13. Thus, the device 10 serves in the capacity of a heat radiator as well as a separator of heavier particles from vapors or gases.

In Figure 5 of the drawings, I have illustrated two of the separator devices arranged in V formation to act as a single separator unit. In this arrangement, the attaching flanges 16 of the two devices 10 are brought into confronting engagement and secured by the bolts 20. This connection brings the inlets 15 of the two devices into communication with a steam supply pipe which may be bolted to the flanges 17—17. In this arrangement, the fitting 18 is dispensed with.

In Figure 6 of the drawings, I have illustrated a modified form of separator device 10' wherein the casing designated 13' is of conical or pyramidal shape and consists of four segmental sections suitably bolted together. The casing body of the device is bowl shape and designated 11' and has the base of the cover 13' bolted thereto. The bottom of the body 11' is provided with a pair of steam inlets 15'—15'. Mounted within the bowl shaped body in spaced relation to the walls of the same is an inner water collecting bowl 28' having a central discharge outlet 31'. Instead of the baffle members being straight as shown in Figures 1 to 5 inclusive, they are circular, and 41' designates an annular trough shaped member and 58' an inverted U-shaped member which are the equivalent to the members 41 and 58 respectively. The members 41' and 58' coact with the annular steps 78' formed on the conical cover 13' to provide an annular zig-zag passage equivalent to that hereinbefore mentioned. The steam rises upwardly through the annular zig-zag passage and escapes through the steam outlet 39' at the top of the conical cover 11'. Water particles baffled by the members 41' and 58' drain into the bowl 28' and pass out through the discharge outlet 31'. The pyramidal shaped separator 10' is similar in principle to the steam purifying device set forth in my prior Patents No. 2,074,505 granted Mar. 23, 1937 and No. 1,848,561, but the improved structure shown herein differentiates particularly in respect to the spaced baffle members to thereby provide greater efficiency.

As stated hereinbefore, I have described the separator device for separating water particles from steam but I do not wish to be limited to such use, for the device is also adaptable for distilling purposes, and for separating harmful constituents of the exhaust gases of internal combustion engines, as clearly explained in my prior Patents No. 1,849,290 granted March 15, 1932, and No. 1,848,561, granted March 8, 1932.

Having thus described the invention, what I claim as new and desire to secure by Letters Patent of the United States, is:

1. A separator of the class described comprising in combination an inclined casing having a steam inlet at the low end and a steam outlet at the high end thereof, a series of troughs in the bottom wall of said casing arranged in step relation, step portions formed on the top wall of said casing defining a plurality of surfaces on the inner side of said top wall, each of said plurality of surfaces being disposed at an angle to an adjacent surface in a rising order, spaced trough shaped members disposed in said troughs supported in spaced relation to the top and bottom walls of said casing, inverted U-shaped baffle members, there being a baffle member interposed between each pair of trough members mounted in spaced relation to the top and bottom walls of said casing, said trough shaped members and said inverted U-shaped members having angular portions arranged in spaced confronting relation to the said plurality of surfaces and cooperating therewith to provide a zig-zag steam passage between said inlet and said outlet, and a water accumulating chamber directly beneath the bottom wall of said casing, the bottom wall of said casing having drain openings leading from said troughs to said chamber.

2. A separator device of the class described comprising in combination, an inclined casing including a body having an inlet at the low end and an outlet at the high end thereof, a cover secured to said body, a plurality of surfaces provided on the inner side of said cover of stepped formation in a rising order, a series of troughs formed in the inclined bottom wall of said body in stepped up order, the bottom wall of said body having drain openings leading from said troughs, a plurality of U-shaped members respectively disposed in said troughs and rising upwardly toward said cover, one upstanding wall of each U shaped member having an angular lip portion in spaced substantially parallel relation to surfaces adjacent thereto of the plurality of surfaces, inverted substantially U-shaped members interposed between and disposed in spaced relation to said U-shaped members, and means for mounting said U-shaped members and said inverted U-shaped members in fixed spaced relation to the bottom wall of said body and the underside of said cover, each of said inverted U-shaped members having portions in spaced relation to adjacent surfaces thereto of said plurality of surfaces, the lip portions on said U-shaped members and portions of said inverted U-shaped members coacting with the said plurality of surfaces to provide a zig-zag passage within said casing from said inlet to said outlet.

3. In combination, a pair of separator units arranged in V-formation having a single inlet at the low crotch portion thereof and an outlet at the high end of each separator unit, the axis of said inlet defining the dividing line of said units, means for securing said units together along the dividing line including gasket means, each of said separator units including a casing, a plurality of spaced baffle members mounted in spaced confronting relation with respect to the top wall of said casing to provide a passage between said inlet and said outlet, and means intermediate said baffle members for trapping and draining particles of relatively high density from gas or vapor when passing upwardly through said passage from said inlet to said outlet.

4. In a separator device of the class described, the combination of an inclined casing having an inlet at the low end and an outlet at the high end thereof, step portions formed on the top wall of said casing defining a plurality of surfaces on the inner side of said wall each disposed at an angle to an adjacent surface in a rising order, and trough shaped baffle member mounted in said casing in spaced relation thereto and to each other, an angular wall projecting from the top of each of the baffle members, the angular walls being respectively arranged in spaced confronting relation to said plurality of surfaces and cooperating therewith to provide a zig-zag passage between said inlet and said outlet, said passage being interrupted at spaced intervals by openings leading into the trough shaped baffle members to afford communication between said passage and the interior of the trough shaped baffle members for trapping particles of relatively high density in said trough shaped baffle members from a gas or vapor when passing through said casing from the inlet to the outlet thereof.

6. In a separator device of the class described, the combination of an inclined casing having an inlet at the low end and an outlet at the high end thereof, step portions formed on the top wall of said casing defining a plurality of surfaces on the inner side of said wall, each of said plurality of surfaces being disposed at an angle to an adjacent surface in a rising order, trough shaped baffle members mounted in said casing in spaced relation to each other and to the top and bottom walls of said casing, angular walls provided at the top of the side walls of each of the trough shaped baffle members, the angular walls being respectively arranged in spaced confronting relation to said plurality of surfaces and cooperating therewith to provide a zig-zag passage between said inlet and outlet, said passage being interrupted at spaced intervals by openings leading into the trough shaped baffle members to afford communication between said passage and the interior of said trough shaped baffle members and by the space between same, stepped troughs provided in the inclined bottom wall of said casing, and an accumulator chamber beneath said casing, the bottom wall of said casing having drain openings leading from said trough and opening into said chamber, and the bottom wall of said baffles having drain openings leading to said troughs.

6. In a separator device of the class described, the combination of a pyramidal shaped casing having an inlet at the base and an outlet at the apex top thereof, a plurality of surfaces on the inner side of the top wall of said casing in a stepped up order, a series of annular baffle members which are trough shaped in cross section mounted in said casing in spaced relation to the inner side of the bottom sloping wall thereof and having angularly disposed annular walls at the top of the side walls thereof which are respectively arranged in spaced confronting relation to said plurality of stepped casing surfaces and cooperating therewith to provide an undulated passage between said inlet and said outlet, the continuity thereof being interrupted by the spaces between said baffle members to provide openings adjacent the tops of said baffle members, and means interposed between adjacent baffle members for trapping and draining particles of relatively high density from a gas or vapor when passing upwardly through said passage from said inlet to said outlet.

7. A separator of the class described comprising a casing having inclined substantially parallel top and bottom walls, an inlet at the low end of said casing and an outlet at the high end thereof, the inner side of the inclined top wall having a plurality of surfaces of stepped formation in a rising order, upstanding baffle members fixedly mounted within said casing in spaced relation to each other and in spaced relation to the bottom wall of said casing, an angular wall at the top of each baffle member, the angular walls of said baffle members being respectively disposed in spaced confronting relation to the plurality of stepped surfaces and cooperating therewith to provide a zig-zag passage between said inlet and said outlet, and troughs at the bottom of said baffle members whereby heavy particles may be trapped by said baffle members and troughs and be thereby separated from gases or vapors during their passage from said inlet to said outlet, said troughs having discharge orifices for the escape of separated particles which may accumulate therein.

8. In a separator device of the class described, the combination of an inclined casing having an inlet at the low end and an outlet at the high end thereof, a plurality of stepped surfaces provided on the inner side of the top wall of said casing, said stepped surfaces being arranged in successive rising order, spaced apart upstanding baffle members fixedly mounted in said casing and disposed in spaced relation to the top and bottom walls thereof, an angular wall at the top of each baffle member respectively arranged in spaced confronting relation with respect to adjacent portions of said stepped surfaces to provide a zig-zag passage therebetween and between said inlet and said outlet, and means intermediate said baffle members for trapping particles of relatively high density from a gas or vapor when passing upwardly through said passage from said inlet to said outlet.

9. In a separator device of the class described, the combination of a casing consisting of a body member having an inlet, and a hollow pyramidal shaped cover member secured thereto having an outlet at the apex thereof, said cover having a plurality of surfaces on the inner side of its top wall in a stepped up order, and a baffle supporting member mounted within said casing in spaced telescopic relation to said cover member and provided with a plurality of stepped troughs, a series of baffle members which are trough shaped in cross section and secured to said supporting member and which respectively extend around the axis of said outlet within said stepped troughs, said baffle members having angular walls at the top of their side walls to provide a plurality of surfaces arranged in spaced confronting relation to said plurality of casing surfaces, and cooperating therewith to provide an undulated passage between said inlet and outlet, the continuity of said passage being interrupted with respect to the baffle members to provide openings adjacent the tops of said baffle members, and the latter and the stepped troughs having outlet openings, whereby particles of relatively high density from a gas or vapor when passing upwardly through said passage from the inlet to the outlet of said casing will be trapped, and drained from said casing.

JULIUS GOLDSTEIN.